US005090126A

United States Patent [19]

Higgins

[11] Patent Number: 5,090,126

[45] Date of Patent: Feb. 25, 1992

[54] ROTARY TOOL QUICK ACTING RETENTION DEVICE

[76] Inventor: Toney D. Higgins, Rte. 1, P.O. Box 64C, Erwin, Tenn. 37650

[21] Appl. No.: 556,990

[22] Filed: Jul. 25, 1990

[51] Int. Cl.⁵ .............................................. B23D 45/16

[52] U.S. Cl. ........................................ 30/388; 83/666; 144/238

[58] Field of Search .................................. 30/388-391, 30/347; 83/666, 698-700, 817, 820; 144/238

[56] References Cited

U.S. PATENT DOCUMENTS 4,205,572 6/1980 Weiner ................................. 83/666
4,589,458 5/1986 McCord ............................. 144/238

*Primary Examiner*—Douglas D. Watts

[57] ABSTRACT

A motor driven rotary tool machine having a drive shaft, an outer end portion thereof having a shoulder thereon, a rotary tool such as a saw blade having a substantially axially positioned aperture, and a retention device for securely but readily removably securing the tool on the shaft tightly against the shoulder means, wherein the retention device includes the threaded bolt receiving bore formed axially in the outer end of the shaft, a bolt mounted through the aperture of the tool and having a shank threaded into the bore, a stop on an outer end portion of the bolt spaced from the tool, and a linearly slidable ramp piece interposed between the tool and the stop and retentively forcing the tool against the shoulder of the bolt.

16 Claims, 2 Drawing Sheets

ROTARY TOOL QUICK ACTING RETENTION DEVICE

BACKGROUND OF INVENTION

1. Field of Invention

This invention concerns a device for retaining a rotary disc-like tool such as a circular cutting blade, particularly a circular saw blade onto the drive shaft of portable hand-held or stationary machine wherein the device provides for quick connect and disconnect of the blade or other tool to and from the shaft without the need for wrenches or the like.

2. Discussion of Prior Art

Heretofore circular saw blades or other rotary tools including grinding wheels, metal cutting rotary blades, abrasive wheels or the like, all hereinafter referred to as blade means, or buffing or polishing wheels or the like have been affixed to their drive shafts by means of bolts as shown in U.S. Pat. No. 4,555,849, or by special locking devices as shown in U.S. Pat. No. 4,706,386. In each of these devices the blade means is removed by loosening and removing a bolt or screw or the like which, of course, requires a wrench and some means to hold the blade means against the rotative force applied generated by the wrench. Both of these requirements represent time delays and often effect physical injury such as skinned knuckles or lacerated fingers.

Objects therefore of the present invention are: to provide a quick connectable and disconnectable means for retaining a rotary disc-like tool means onto its drive shaft; to provide such device which requires the simplest of physical manipulation to affix the tool means or to remove it from the shaft; and to construct such device with structural design which provides an exceptionally high degree of operational safety.

SUMMARY OF THE INVENTION

These and other objects hereinafter appearing have been attained in accordance with the present invention which is defined in its operative assembled aspect as a power operated rotary tool machine having a drive shaft, an outer end portion of said shaft having shoulder means thereon, tool means having axially positioned mounting aperture means, and retention means for securely but readily removably holding the tool means on said shaft tightly against said shoulder means, wherein said retention means comprises a threaded bore formed axially in the end of said shaft, bolt means mounted through said aperture means of said tool means and having shank means threaded into said bore and having outer stop means spaced from said tool means, and substantially linearly operable ramp means interposed between said tool means and said stop means and retentively forcing said tool means against said shoulder means.

GENERAL DESCRIPTION OF THE INVENTION

The present retention device as defined above utilizes the concept of a ramp, which terms as used herein includes cam, to provide the mechanical advantage needed to hold the blade against the shoulder means on the shaft with sufficient force to prevent it from rotating thereon. It is noted that the commonly employed retaining bolt for securing circular blades to their shafts is, in a sense, a ramp device since the threads thereof are inclined to the horizontal. It is noted that the bolt as shown may be a threaded drive shaft provided with a nut in place of the bolt head. The present invention resides however, in the type of force necessary to tighten or loosen the ramp mechanism. In the use of a thread type ramp the force is obviously rotationally applied, whereas with the present device the force is applied in a simple linear direction. The threaded devices thus require the application of a counter rotative force thereto in order to be loosened or tightened which means that the blade must be held stationary, usually by the application of force through the use of a hand held blade stopper such as a screw driver or block of wood. Even then, proper tightening of the bolt which requires a wrench is often difficult and loosening of it to change the blade can be extremely vexing. With the present linear ramp device however, a single hand wielding any instrument capable of delivering a slight blow to the device is essentially all that is required for changing the blade, and the need for a wrench and blade stopper, and the use of two hands is eliminated.

DETAILED DESCRIPTION OF THE INVENTION

The invention will be further understood from the following description and drawings wherein.

Figure 1:
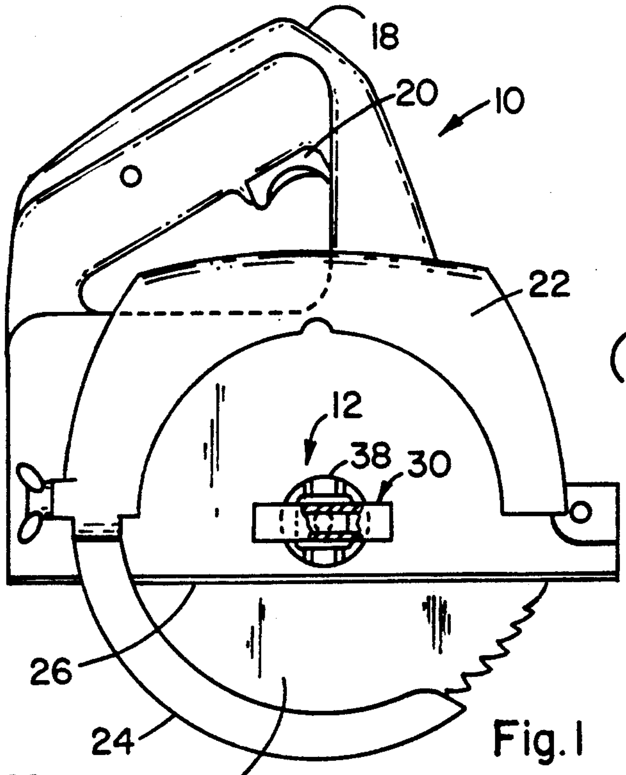
FIG. 1 is a side view of a circular saw embodying the present retention device shown enlarged and with portions broken away for clarity.
Figure 4:
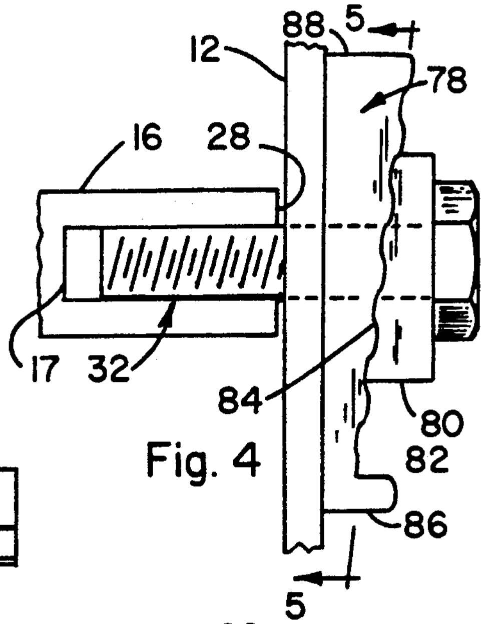
FIG. 4 is a partially cross-sectioned side view of a variation of the retention device.
Figure 3:
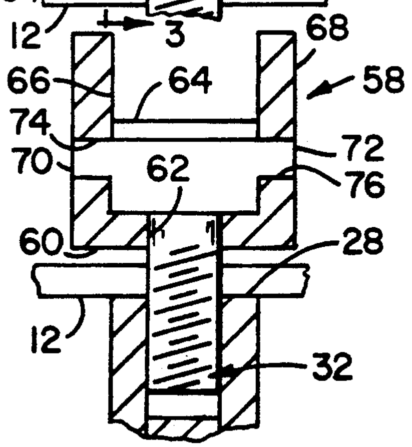
FIG. 3 is a cross-sectional view of the retention device of FIG. 2 taken along line 3—3 of FIG. 2 in the direction of the arrows.

Referring to the drawings which are illustrative only and not drawn to scale, and wherein the same numbers are used in the several figures to identify the identical or equivalent structural elements or features, a typical circular saw generally designated 10 is shown on which the present retention device generally designated 12 is positioned to frictionally secure the blade 14 to the drive shaft 16 which shaft is shown in FIGS. 3 and 4. The shaft and retention device are shown enlarged in some figures for purposes of clarity. The saw is provided with customary handle 18, trigger switch 20, upper blade guard 22, lower retractable blade guard 24 and adjustable work contacting platform or base 26. A typical saw is shown, for example, in U.S. Pat. No. 4,555,849, the disclosure of which is incorporated herein by reference.

Figure 7:
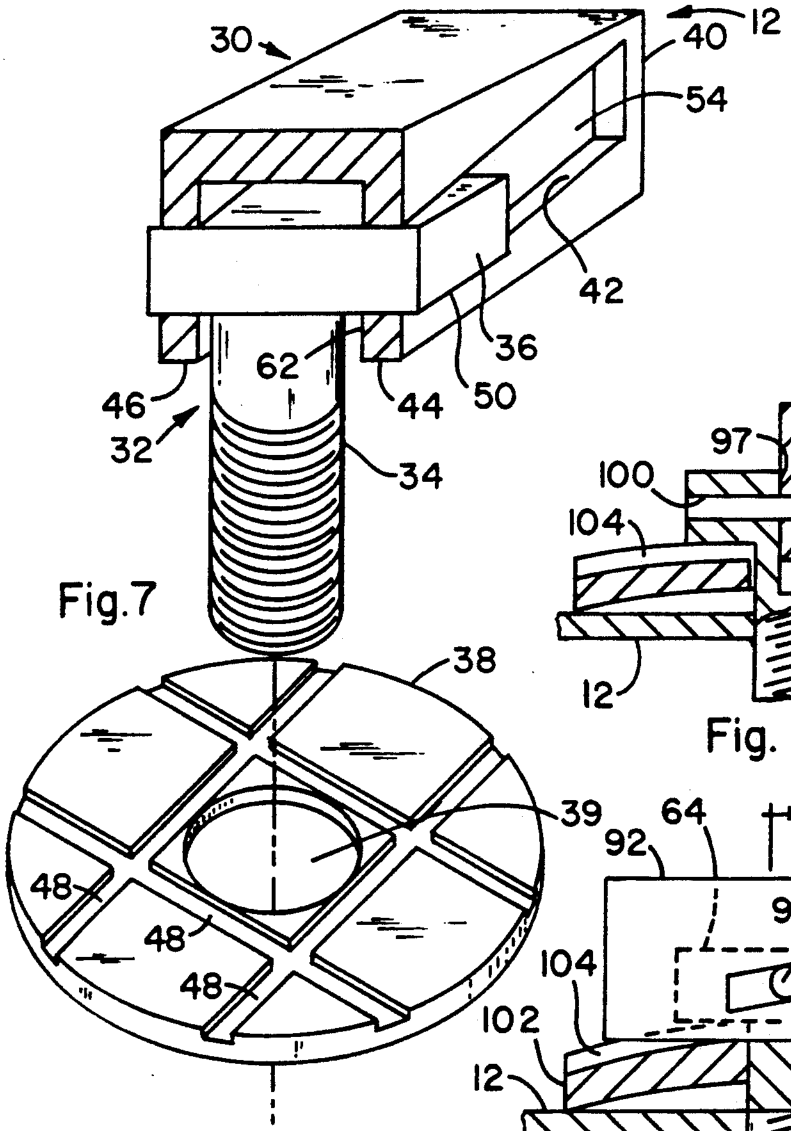
FIG. 7 is a perspective view of the device of FIG. 6 taken along line 7—7 thereof in the direction of the arrows.
Figure 8:
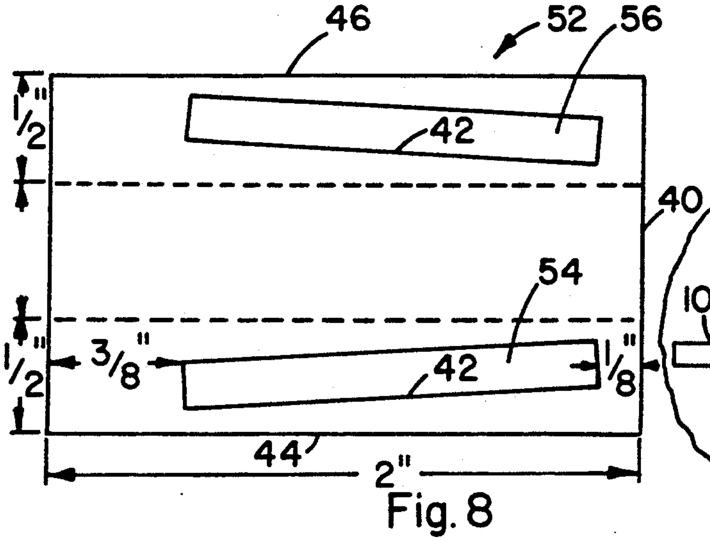
FIG. 8 is an elevational view of a sheet metal blank for the manufacture of the device of FIG. 7.

Referring further to the drawings, the rotary tool, which term is used herein to include conventionally employed washers and the washer described below, is frictionally held against the shaft end 28 (see FIGS. 3, 4 and 6) or equivalent shoulder means on the shaft which may, e.g., be set back slightly from the end thereof, by means of the present retention device, one embodiment thereof being shown in FIGS. 6–8 in an assembly context comprising a wedge or ramp block 30, bolt means 32 having threaded shank 34 and head or stop 36, grooved washer 38 or equivalent having bolt aperture 39, saw blade 12, and saw drive shaft 16 having a threaded, bolt receiving bore 17.

Figure 6:
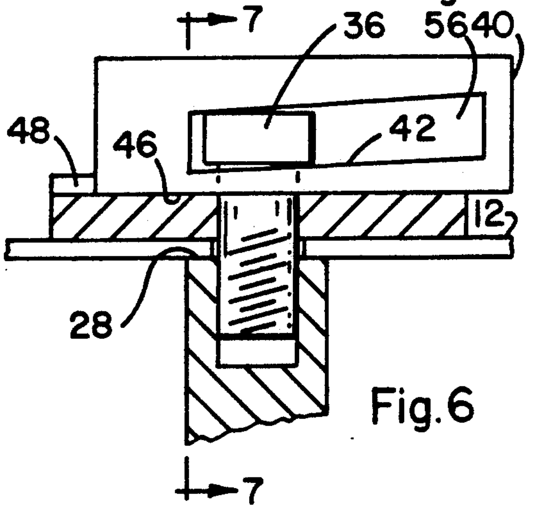
FIG. 6 is a side view, partially in section, of the retention device of FIG. 1.

Referring to FIG. 6, the relative positions of all of these elements is such that a tap with any tool, e.g., the handle of a screwdriver, against end 40 of the block will force upwardly slanting ramps 42 further underneath bolt head 36 or a washer means thereunder and lock blade 12 very tightly against end or shoulder 28 of the shaft. It is particularly noted that the inwardly directed edge surfaces or bases 44 and 46 of the ramp block slide in guide grooves 48 in the washer and are thus prevented from spreading such as might reduce the compressive force against the blade. The angle or slant that the ramps of any of the embodiments shown herein makes with the base surfaces of the ramp block can be widely varied, e.g., between about 0.5 to about 25 degrees since once the bolt means had been finger tightened, a very slight movement of the block will provide the necessary compressive force. The bolt head 36 is shown as a conventional, off-the-shelf one, however, the contact underside 50 thereof may be machined slanted to lie flat against ramps 42 such as to effect a more mechanically perfect ramping action.

In manufacturing the ramp block 30, a steel blank 52 may be employed with the ramp slots 54, 56 stamped therethrough. Bending of the blank at right angles along the dotted lines with bolt head in place will form the block shown in FIG. 7. It is noted that the dimensions shown in FIG. 8 wherein "BD" designates the bolt diameter are exemplary only and can be varied according to the type of blade and shaft involved. It has been found that the dimensions shown, wherein the steel thickness is between about 0.08 and 0.2 inches is quite satisfactory, however, depending on the type of material employed therefor, this thickness can be varied. Similarly, the slant of the ramps shown in FIG. 8 has functioned without fault, with absolutely no tendency for the block to retract from its high pressure position during rigorous use of the circular saw.

Figure 2:
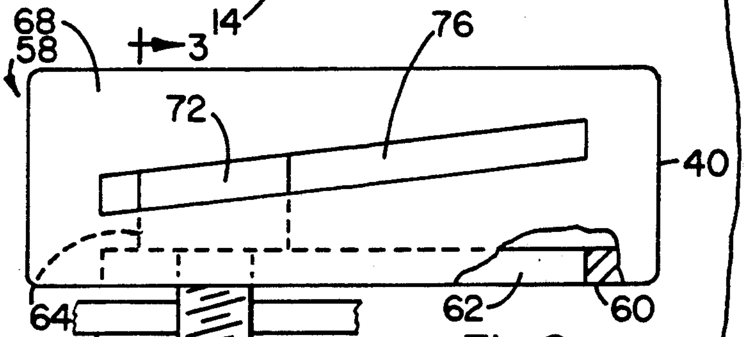
FIG. 2 is an enlarged partial cross-sectional side view of a variation of the retention device embodiment of FIG. 1 in its untightened position.

Referring to the alternative embodiment of FIGS. 2 and 3, the ramp block 58 is formed essentially up-side-down from block 30 such that its base 60 may contact the saw blade and thus eliminate the need, or at least desirability, for a separate washer. A passage 62 in the base slidably accommodates the bolt shank. In this embodiment, a modified bolt head 64 is shown as being machined to closely but slidingly fit between the block sides 66, 68 and having slanted segments 70, 72 slidably mounted through the ramp slots 74, 76 respectively. This structure provides a very convenient handle means for rotating bolt 32 to and from its intermediate or barely loosened position from which the bolt can easily be finger rotated to remove it, or finger rotated to slightly tighten the blade/retention device assembly in preparation for actuation of the device by striking the end 40 of the block.

Figure 5:
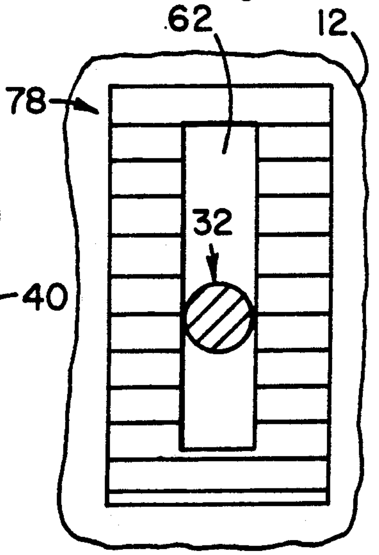
FIG. 5 is a view taken along line 5—5 of FIG. 4 in the direction of the arrows.

Referring to the embodiment of FIGS. 4 and 5, the slidable ramp block 78 and fixed washer 80 are provided with cooperating or mating ridges 82, 84 respectively of any suitable dimensions and slidable configuration, across which the block can frictionally slide by impact force applied against its ends 86 or 88 to loosen or tighten the assembly respectively. Washer 80 is preferably rectangular and of about the same width as block 78. It is noted that in all of the embodiments shown, it is preferred that the bolt 32 does not bottom out in bolt bore 17 in the shaft 16 as the bolt is finger tightened to the aforesaid intermediate position, otherwise the ramp block may not be sufficiently long to completely tighten the assembly.

Figure 10:
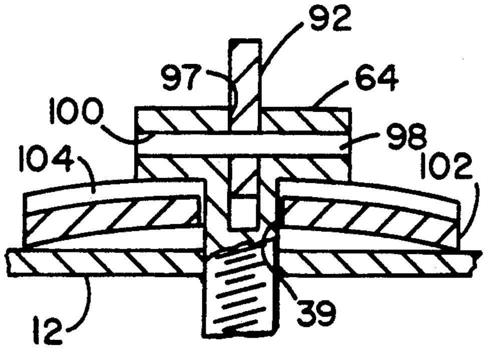
FIG. 10 is a cross-sectional view taken along line 10—10 of FIG. 9 in the direction of the arrows.
Figure 9:
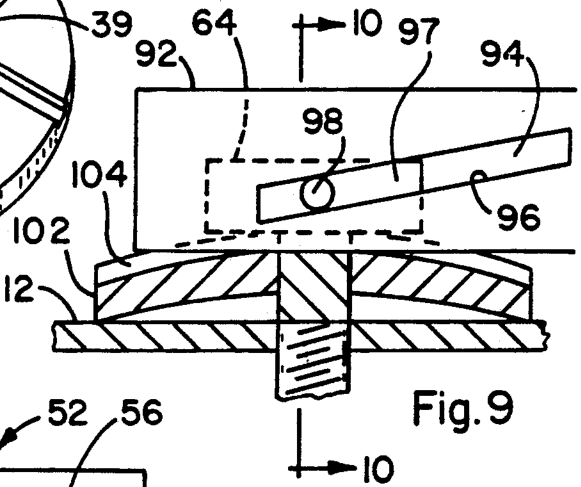
FIG. 9 is a cross-sectional side view of another variation of the retention device.
Figure 11:
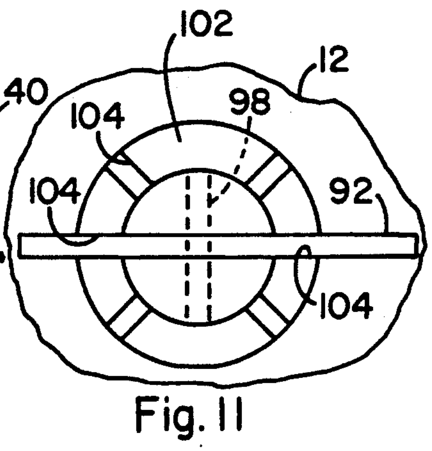
FIG. 11 is a top elevational view of the retention device of FIGS. 9 and 10.

Referring to the embodiment of FIGS. 9–11, the ramp block is in the form of a key 92 of hardened steel or the like provided with slot 94 and ramp surface 96. The bolt head is formed with a recess at 97 and provided with a pin 98 also of hardened steel or the like passing though slot 94 and pressed into pin bearing aperture 100 in the bolt head. It is preferred that washer 102 be used and provided with slots 104 in which key 92 can slide to cam the assembly against pin 98 to a tightened position.

It is noted that the structural features of any of the various embodiments shown can be used to modify the other embodiments for whatever advantage one may desire. For example, the ridges 82, 84, or any equivalent thereof, shown in FIG. 4 can be incorporated in any of the ramp surfaces shown. The materials of construction are typically metal, preferably hardened or stainless steel, however, tough plastics such as cellulose acetate butyrate may be employed.

The invention has been described in detail with particular reference to preferred embodiments thereof but it will be understood that variations and modifications will be effected within the spirit and scope of the invention.

I claim:

1. A motor driven rotary tool machine having a drive shaft, an outer end portion of said shaft having shoulder means thereon, tool means having substantially axially positioned mounting aperture means, and retention means for securely but readily removably securing the tool means on said shaft tightly against said shoulder means, wherein said retention means comprises a threaded bore formed axially in the outer end of said shaft, bolt means mounted through said aperture means and having shank means threaded into said bore, stop means on an outer end portion of said bolt means spaced from said tool means, and substantially linearly slidable ramp means interposed between said tool means and said stop means and retentively forcing said tool means against said shoulder means, wherein said ramp means comprises a ramp block adapted for linear movement and having side wall means lying adjacent opposite sides of said bolt means, a ramp surface on each of said side wall means and positioned adjacent the underside of said stop means on either side of said shank means and adapted to slide against and across said underside, each of said wall means having a substantially planar base surface adapted to slidingly engage the outer surface of a rotary tool as said ramp block is moved generally linearly in a transverse direction with respect to the axis of said bolt means, the linear movement of said ramp block in one direction imparting generally axially directed force to said underside of said stop means and to said outer surface of said rotary tool.

2. The machine of claim 1 wherein washer means is interposed between said base surfaces of said ramp block and said rotary tool, wherein substantially parallel slot means are provided in the outer face of said washer laterally on either side of the bolt aperture therethrough, said base surfaces being positioned and slidable within said slot means for imparting to and maintaining lateral stability and correct positioning of said wall means.

3. The machine of claim 1 wherein said underside of said stop means is bevelled at substantially the same angle with respect to the bolt axis as the angle said ramp surfaces make with respect to the bolt axis.

4. The machine of claim 1 wherein said ramp surfaces are provided by slot means formed through each said wall means.

5. The machine of claim 4 wherein said stop means is provided on opposite sides with first shoulder means slidably juxtaposed said wall means, and with second shoulder means slidably mounted within said slot means, said first and second shoulder means in cooperation with said slot means providing a slidable but captured bolt means.

6. The machine of claim 1 wherein said ramp surfaces are generally inclined with respect to said base surfaces at an angle between about two and eight degrees.

7. The machine of claim 1 wherein said ramp block is formed from a substantially rectangular metal blank in which substantially mirror image slot means are stamped out in the area of said wall means lying on either side of a longitudinally extending web portion, and wherein the blank is deformed along substantially parallel, longitudinal lines to provide two substantially parallel walls depending from said web portion, and wherein said slot means are substantially opposite and parallel to each other in the formed block.

8. The machine of claim 1 wherein said ramp means comprises a wedge shaped, elongated block having elongated slot means therein for slidably accomodating the shank of said bolt means.

9. The machine of claim 1 wherein contacting, sliding surfaces of said block means and a substantially fixed position element of said retention means are provided with cooperating ridge means adapted for slidable interfitting and resisting relative motion therebetween when said retention means is in its actuated position.

10. The machine of claim 1 wherein said retention means comprises generally transverse recess means in the outer end of said bolt means, pin means mounted in said bolt means and extending substantially laterally through said recess means, substantially flat key means having ramp slot means transversely therethrough and slidably mounted in said recess means with said pin means slidably mounted through said slot means, whereby linear motion of said key means in its actuated direction will engage a ramp surface of said ramp slot with said pin means to tighten said tool means on said drive shaft.

11. A rotary tool retention device for use on a motor driven rotary tool machine, said machine having a drive shaft, an outer end portion of the shaft having shoulder means thereon, rotary tool means, bolt means having shank means and stop means, the shank means being adapted to pass through aperture means in the tool means and thread into threaded socket means in the outer end of the shaft, the retention device being adapted for securely but readily removably securing the tool means on the shaft tightly against the shoulder means, said retention device comprising elongated body means having generally longitudinally extending ramp surface means and generally longitudinally extending base surface means, said ramp and base surface means being spaced apart and angled with respect to each other, one of said ramp or base surface means being adapted to slidably engage the stop means of the bolt means, and the other of said ramp or base surface means being adapted to slidably engage the outer surface of the tool means, and impact surface means on said body means having generally longitudinally opposed generally transversely directed surfaces, said surfaces adapted to be selectively struck with sufficient force to move said body means in a desired longitudinal direction to selectively tighten or loosen the tool means on the drive shaft.

12. The tool retention device of claim 11 wherein said body means is elongated and provided with passage means extending substantially longitudinally therethrough for slidably accommodating the shank of said bolt means, said ramp surface means comprising a ramp on either side of said passage means and adapted to slidably engage said stop means.

13. The device of claim 12 wherein said ramps are provided by the edges of a slot formed in each of two side walls of said body means.

14. The device of claim 13 wherein said stop means projects through said slots and is slidable therein.

15. The device of claim 11 wherein the contact surfaces of said ramps are provided with friction increasing ridge means.

16. The device of claim 11 wherein said body means comprises a flat, elongated key member having a generally longitudinal but slightly upwardly angled slot therethrough providing said ramp surface means.

* * * * *